(12) United States Patent
Takahashi et al.

(10) Patent No.: US 9,105,399 B2
(45) Date of Patent: Aug. 11, 2015

(54) METHOD OF MANUFACTURING A SOLID ELECTROLYTIC CAPACITOR HAVING SOLID ELECTROLYTIC LAYERS AND AN AMINE COMPOUND LAYER

(71) Applicant: NEC TOKIN CORPORATION, Sendai-shi, Miyagi (JP)

(72) Inventors: Masanori Takahashi, Sendai (JP); Satoshi Iwai, Sendai (JP); Masami Ishijima, Sendai (JP)

(73) Assignee: NEC TOKIN CORPORATION, Sendai (JP)

( * ) Notice: Subject to any disclaimer, the term of this patent is extended or adjusted under 35 U.S.C. 154(b) by 36 days.

(21) Appl. No.: 14/083,510

(22) Filed: Nov. 19, 2013

(65) Prior Publication Data

US 2014/0079875 A1    Mar. 20, 2014

Related U.S. Application Data

(62) Division of application No. 13/205,329, filed on Aug. 8, 2011, now Pat. No. 8,614,879.

(30) Foreign Application Priority Data

Aug. 19, 2010 (JP) ................. 2010-183556

(51) Int. Cl.
*H01G 9/00* (2006.01)
*H01G 9/025* (2006.01)
*H01G 9/028* (2006.01)
*H01G 9/15* (2006.01)

(52) U.S. Cl.
CPC ............ *H01G 9/0036* (2013.01); *H01G 9/025* (2013.01); *H01G 9/028* (2013.01); *H01G 9/15* (2013.01); *Y10T 29/417* (2015.01)

(58) Field of Classification Search
None
See application file for complete search history.

(56) References Cited

U.S. PATENT DOCUMENTS

| 3,003,089 | A | * | 10/1961 | Bernard et al. | ............... 361/504 |
| 4,117,531 | A | * | 9/1978 | Ross et al. | .................... 361/505 |
| 7,682,753 | B2 | | 3/2010 | Koh et al. | |
| 7,916,455 | B2 | | 3/2011 | Yoshida et al. | |
| 2006/0236531 | A1 | | 10/2006 | Merker et al. | |
| 2009/0021894 | A1 | | 1/2009 | Ning et al. | |

FOREIGN PATENT DOCUMENTS

| JP | A-09-306788 | 11/1997 |
| JP | A-2005-109252 | 4/2005 |
| WO | 2010/089111 A1 | 8/2010 |

* cited by examiner

*Primary Examiner* — Scott B Geyer
(74) *Attorney, Agent, or Firm* — Oliff PLC

(57) ABSTRACT

A solid electrolytic capacitor according to an aspect of the present invention includes an anode conductor including a porous valve metal body, a dielectric layer formed on a surface of the anode conductor, and a solid electrolyte layer including a conductive polymer layer formed on a surface of the dielectric layer, in which the solid electrolyte layer includes a first solid electrolyte layer formed on a surface of the dielectric layer, and a second solid electrolyte layer formed on a surface of the first solid electrolyte layer, and at least one continuous or discontinuous layer containing an amine compound exists between the first and second solid electrolyte layers, and inside the second solid electrolyte layer.

1 Claim, 1 Drawing Sheet

METHOD OF MANUFACTURING A SOLID ELECTROLYTIC CAPACITOR HAVING SOLID ELECTROLYTIC LAYERS AND AN AMINE COMPOUND LAYER

INCORPORATION BY REFERENCE

This is a Divisional of application Ser. No. 13/205,329 filed Aug. 8, 2011, which is based upon and claims the benefit of priority from Japanese patent application No. 2010-183556, filed on Aug. 19, 2010, the disclosures of which is incorporated herein in their entirety by reference.

BACKGROUND OF THE INVENTION

1. Field of the Invention

The present invention relates to a solid electrolytic capacitor and its manufacturing method, in particular to a solid electrolytic capacitor having a low ESR and high reliability, and its manufacturing method.

2. Description of Related Art

The development of a solid electrolytic capacitor in which a dielectric oxide film is formed on a porous body made of a valve metal such as tantalum and aluminum by an anodic oxidation method, and then at least one conductive polymer layer is formed on this oxide film and used as a solid electrolyte layer has been in progress.

The formation method of the conductive polymer layer, which is used as the solid electrolyte layer of such a solid electrolytic capacitor, is broadly divided into two methods, i.e., a chemical oxidation polymerization method and an electrolytic oxidation polymerization method. Examples of known monomers that can constitute a conductive polymer material include pyrrole, thiophene, 3,4-ethylene dioxythiophene, aniline or the like.

The solid electrolytic capacitor like this has a lower equivalent series resistance (called "ESR") than that of conventional capacitors using manganese dioxide as a solid electrolyte layer, and is beginning to be used for a variety of purposes. As the frequency and the current of integrated circuits have been increasing in recent years, the demand for solid electrolytic capacitors having a lower ESR, a larger capacitance, and a smaller loss has grown.

Japanese Unexamined Patent Application Publication No. H09-306788 (Patent literature 1) discloses a technique to achieve excellent capacitor characteristics while reducing the number of necessary processes by adding a colloidal solution of polymer fine particles during formation of a conductive polymer layer.

Japanese Unexamined Patent Application Publication No. 2005-109252 (Patent literature 2) discloses a technique to form a conductive polymer layer on a dielectric oxide film by chemical oxidation polymerization and then to apply and dry a conductive polymer solution. According to the literature, by doing so, it is possible to ensure the thickness of the conductive polymer layer, prevent damage to the dielectric oxide film caused by a stress, and reduce the manufacturing time.

In the method disclosed in Patent literature 1, the colloid of polymer fine particles is present. However, the conductive polymer layer is formed by chemical oxidation polymerization. Therefore, because of the nature of the chemical oxidation polymerization, it is very difficult to form a fine conductive polymer layer having an excellent adhesive property.

Meanwhile, the method disclosed in Patent literature 2 makes it possible to form a conductive polymer layer having a sufficient thickness by applying and drying a conductive polymer solution. However, due to the effects of the surface tension and the wettability of the conductive polymer solution, the central portion of the conductive polymer layer tends to become thicker while the peripheral portion (corner portion) tends to become thinner. Further, since the adhesive property between the layer formed by the chemical oxidation polymerization and the layer formed by applying and drying the conductive polymer solution is poor, there is a problem that they tend to be separated from each other due to a thermal stress or a mechanical stress that is caused at the time of mounting or the like.

SUMMARY OF THE INVENTION

An object of the present invention is to provide a solid electrolytic capacitor that has high reliability and is less likely to cause failures due to a leakage current and/or an increased ESR even when heat and stresses are exerted at the time of packaging, mounting or the like, and its manufacturing method.

The present invention has been made based on a finding that a highly-reliable solid electrolytic capacitor including a solid electrolyte layer having a uniform thickness and an excellent adhesive property can be obtained by forming an amine compound layer after the formation of a first solid electrolyte layer, and further forming a second solid electrolyte layer so that the solid electrolyte layer that is negatively charged by an effect of a sulfonic acid-based compound taken in as dopant is firmly adhered by the positively-charged amine compound layer. That is, a solid electrolytic capacitor according to an aspect of the present invention includes: an anode conductor including a porous valve metal body; a dielectric layer formed on a surface of the anode conductor; and a solid electrolyte layer including a conductive polymer layer formed on a surface of the dielectric layer, in which the solid electrolyte layer includes a first solid electrolyte layer and a second solid electrolyte layer, and at least one continuous or discontinuous layer containing an amine compound exists between the first and second solid electrolyte layers, and inside the second solid electrolyte layer.

It is preferable that at least part of the porous body is filled with the first solid electrolyte layer and 80% or more of the dielectric layer surface is coated with the first solid electrolyte layer.

It is also preferable that the amine compound is water-insoluble and a thickness of the amine compound layer is not less than 10 nm and not greater than 500 nm.

A method of manufacturing a solid electrolytic capacitor according to an aspect of the present invention includes: forming a dielectric layer on a surface of an anode conductor including a porous valve metal body; forming a first solid electrolyte layer on the dielectric layer surface by using a chemical polymerization method, an electrolytic polymerization method, or a method of applying and drying a conductive polymer solution; forming an amine compound layer by applying and drying an amine compound solution or an amine compound dispersion liquid; and forming a second solid electrolyte layer by applying and drying a conductive polymer solution.

The first solid electrolyte layer is preferably formed by applying and drying a conductive polymer dispersion liquid (hereinafter called "conductive polymer solution") whose particle diameter (D90) corresponding to cumulative volume fraction 90% of the conductive polymer is not less than 5 nm and not greater than 100 nm.

Further, the second solid electrolyte layer is preferably formed by applying and drying a conductive polymer solution whose particle diameter (D10) corresponding to cumulative volume fraction 10% of the conductive polymer is not less than 100 nm and not greater than 50 µm.

The particle diameter of the conductive polymer is desirably measured based on a method specified in JIS Z8826.

According to an aspect of the present invention, a dielectric layer and a first solid electrolyte layer are formed on a surface of an anode conductor composed of a porous valve metal body, and then an amine compound layer is formed. Further, an amine compound layer is formed halfway through the formation of a second solid electrolyte layer, so that a positively-charged amine compound and a negatively-charged conductive polymer layer are electro-statically attracted to each other. As a result, a solid electrolyte layer having a uniform thickness and an excellent adhesive property can be formed.

Accordingly, the present invention can provide a solid electrolytic capacitor having a high tolerance to externally-exerted heat and stresses and having excellent reliability.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Exemplary embodiments according to the present invention are explained hereinafter with reference to the drawings.

Figure 1A:
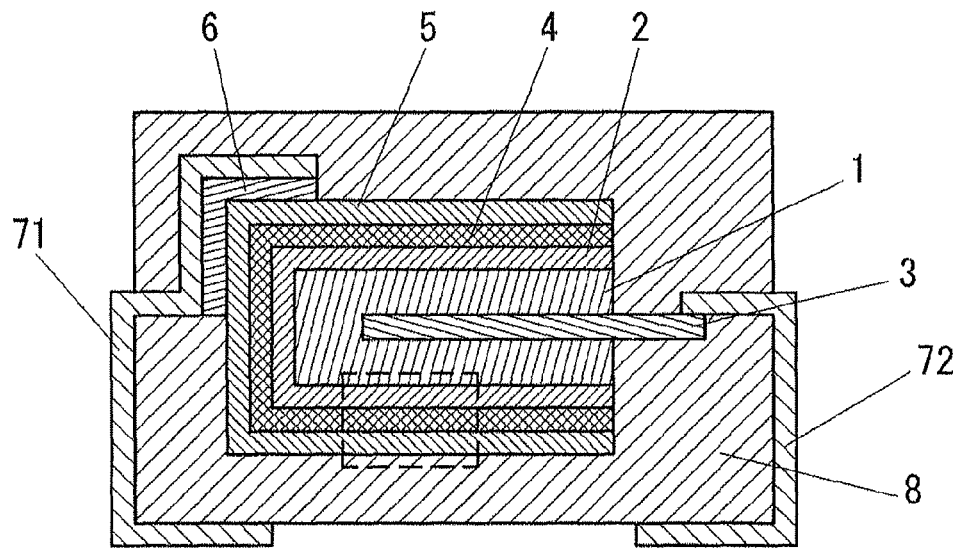
FIG. 1A is a schematic cross-section illustrating a solid electrolytic capacitor of an exemplary embodiment according to the present invention.
Figure 1B:
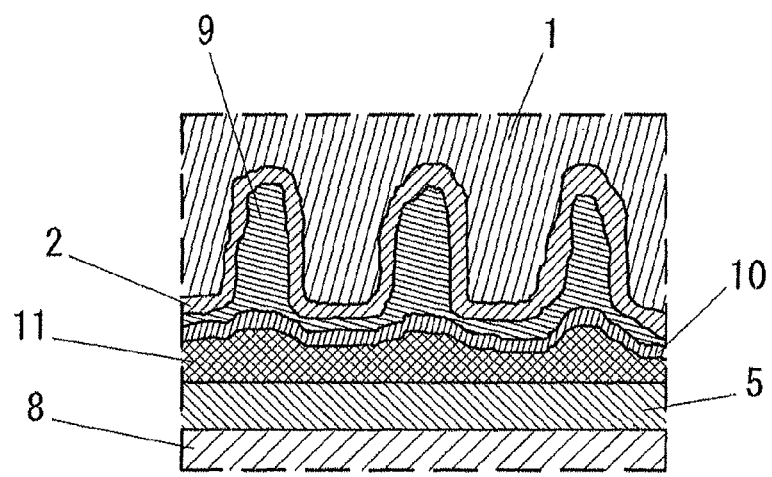
FIG. 1B is an enlarged view of an area indicated by dashed lines in FIG. 1A.

FIG. 1A a schematic cross-section illustrating a solid electrolytic capacitor as a whole, and FIG. 1B is an enlarged view of an area near a solid electrolyte layer 4 indicated by dashed lines in FIG. 1A.

The structure of the solid electrolytic capacitor of this exemplary embodiment according to the present invention is fundamentally similar to that of convention solid electrolytic capacitors except for the structure of a solid electrolyte layer 4. That is, any publicly-known materials and shapes can be used for the solid electrolytic capacitor except for those for the solid electrolyte layer 4, and there are no particular restrictions on them.

As shown in FIG. 1A, a solid electrolytic capacitor of this exemplary embodiment according to the present invention includes an anode conductor 1 composed of a porous valve metal, and a dielectric layer 2 formed on a surface of the anode conductor 1. Further, a first solid electrolyte layer 9 is formed on a surface of the dielectric layer 2.

The first solid electrolyte layer 9 is formed by using at least one of a chemical polymerization method, an electrolytic polymerization method, and a method of applying and drying a conductive polymer solution A (which is described later). Further, at least part of the porous body is filled with the first solid electrolyte layer 9.

The first solid electrolyte layer 9 contains, for example, a polymer composed of monomers containing at least one of pyrrole, thiophene, aniline, and their derivatives, and preferably containing at least one of pyrrole, 3,4-ethylene dioxythiophene, and their derivatives. In addition, the first solid electrolyte layer 9 preferably contains a sulfonic acid-based compound as dopant.

Next, the anode conductor 1 is submerged in an amine compound solution or an amine compound dispersion liquid, and then dried after being pulled out from the solution. As a result, an amine compound layer 10 is formed on the surface of the first solid electrolyte layer 9.

Examples of the amine compound include m-phenylenediamine, 2.3-diaminotoluene, 2,6-diaminotoluene, 1,8-diaminooctane, 1,10-diaminodecane, and 1,12-diaminododecane.

The amine compound is preferably insoluble, because it needs to be submerged in a conductive polymer solution B using water as the principal solvent (which is described later) in a subsequent process for forming a second solid electrolyte layer 11. Further, to prevent the amine compound layer 10 formed on the dielectric layer 2 from being washed away by water, the coating rate of the first solid electrolyte layer 9 on the surface of the dielectric layer 2 is preferably 80% or greater.

Water or ethanol is preferably used as the solution into which the amine compound is dispersed or dissolved. Further, when the formed amine compound layer 10 is excessively thick, there is a possibility that inter-layer peeling occurs and/or the amine compound layer 10 acts as a resistance at the interface. Therefore, the thickness of the amine compound layer 10 is preferably 500 nm or smaller. On the other hand, when the formed amine compound layer 10 is excessively thin, a sufficient adhesive property cannot be obtained. Therefore, the thickness of the amine compound layer 10 is preferably 10 nm or greater.

Next, the anode conductor 1 on which the amine compound layer 10 is formed is submerged in a conductive polymer solution B, and then dried after being pulled out from the solution. As a result, a second solid electrolyte layer 11 is formed.

The conductive polymer solution A and the conductive polymer solution B used in the present invention contain, as principal ingredients, a polymer containing at least one of pyrrole, thiophene, aniline, and their derivatives; a dopant; and, as a solvent, water or a mixture solution of water and an organic solvent(s).

Preferably, the polymer contains at least one of pyrrole, 3,4-ethylene dioxythiophene, and their derivatives.

Preferable a dopant is a sulfonic acid-based compound composed of at least one of naphthalenesulfonic acid, benzenesulfonic acid, styrenesulfonic acid, and their derivatives.

As for the solvent, either of water or a mixture solvent of water and a water-soluble organic solvent(s) may be used.

A preferable organic solvent is a polar solvent such as dimethylformamide, dimethylacetamide, dimethyl sulfoxide, ethylene glycol, glycerine, and sorbitol. By mixing an organic solvent like these, the dissolution of the polymer is accelerated in no small way and the film-formation property is improved. Therefore, an organic solvent is preferably added in an appropriate amount.

The conductive polymer solution A, which is used for the formation of the first solid electrolyte layer 9, is filled into pores of the porous body. Therefore, it is necessary to use a conductive polymer solution having a small particle diameter with respect to the diameter of the pores on the porous body surface. That is, D90 of the conductive polymer is preferably no less than 5 nm and no greater than 100 nm.

In order to achieve a sufficient capacitance and a low ESR, the submersion to the conductive polymer solution A and the drying process may be carried out more than one time.

Meanwhile, the second solid electrolyte layer 11 needs to completely cover the anode conductor 1 and to have a high tolerance to mechanical stresses and thermal stresses exerted at the time of the molding. Therefore, the particle diameter of the used conductive polymer solution B is preferably larger than that of the conductive polymer solution A used for the formation of the first solid electrolyte layer 9, and D10 of the conductive polymer solution B is preferably no less than 100 nm and no greater than 50 μm.

The particle diameter of the conductive polymer is desirably measured based on a method specified in JIS Z8826.

By forming the amine compound layer 10 after the formation of the first solid electrolyte layer 9, the adhesive property to the second solid electrolyte layer 11 is improved and the coating property at the corner portion and on the side portion of the anode conductor 1 is also improved. However, when the formation of the second solid electrolyte layer at the corner portion or on the side portion of the anode conductor 1 on which the first solid electrolyte layer 9 is formed is determined to be insufficient at the time when the anode conductor 1 is submerged to the conductive polymer solution B and then dried, it is necessary to repeat the process of forming the amine compound layer and the second solid electrolyte layer 11. Further, there is no restriction on how many times the process is repeated. After that, a cathode layer 5 is formed by using conductive paste such as graphite paste and silver paste. Lead frames 71 and 72 are connected to the cathode layer 5 and an anode lead 3 respectively by using a conductive adhesive 6 or by welding, and they are integrally packaged by molding by using an outer-sheath resin 8. As a result, a solid electrolytic capacitor is obtained.

EXAMPLES

Examples of the present invention are further explained in more specific manner with reference to FIG. 1.

Example 1

A rectangular parallelepiped press body of 3.5 mm in height, 3.0 mm in width, and 1.5 mm in thickness formed of about 30,000 (μFV/g:CV/g) of tantalum powder in which a tantalum wire of 0.4 mm in diameter is embedded as the anode lead 3 was sintered at about 1,500° C. to produce a tantalum sintered body. A voltage of 30 V was applied to this sintered body in a phosphoric acid aqueous solution to carry out anodic oxidation and thereby to form a dielectric layer 2.

Next, the tantalum sintered body coated by the dielectric layer 2 was submerged in an aqueous solution containing ammonium peroxydisulfate, which is an oxidizing agent, and 1,3,6-naphthalene trisulfonic acid. Next, after dried at a room temperature, it was submerged in 3,4-ethylene dioxythiophene and then kept at a room temperature to polymerize 3,4-ethylene dioxythiophene. A series of these polymerization processes was repeated three times to form a first solid electrolyte layer 9 composed of conductive poly-3,4-ethylene dioxythiophene. Further, at this point, the coating rate of the first solid electrolyte layer was 88%. Note that the coating rate was verified after being manufactured as a finished product by measuring the capacitance appearance ratio.

Next, after washed with ethanol and dried, it was submerged in an ethanol solution containing 1,10-diaminodecane in an amount of 5 wt.% and then dried at 125° C. for 10 minutes to form an amine compound layer 10. Note that 1,10-diaminodecane is a water-insoluble amine compound.

Next, it was submerged in a mixture aqueous solution containing poly-3,4-ethylene dioxythiophene and polystyrene sulfonate in an amount of 3 wt. % (conductive polymer solution B), and dried at 125° C. for 20 minutes to form a first conductive polymer layer of the second solid electrolyte layer 11. A commercially-available conductive polymer solution whose D10 is 500 nm was used as the conductive polymer solution B. Next, a series of the processes from the formation of the amine compound layer 10 to the formation of the conductive polymer layer was repeated twice to form the second solid electrolyte layer 11. Therefore, in Example 1, three compound layers 10 and three conductive polymer layers 3 were formed in an alternate fashion. At this point, the average thickness of the amine compound layer 10 was 50 nm.

After that, an anode layer 5 was formed by using graphite paste and silver paste as conductive paste. Lead frames 71 and 72 were connected to the cathode layer 5 and the anode lead 3 respectively by using a conductive adhesive 6 or by welding, and they were integrally packaged by molding by using an outer-sheath resin 8. As a result, a solid electrolytic capacitor was obtained.

Example 2

A mixture aqueous solution containing poly-3,4-ethylene dioxythiophene and polystyrene sulfonate in an amount of 3 wt. % (conductive polymer solution A) was used for the formation of the first solid electrolyte layer 9.

A tantalum sintered body on which a dielectric layer 2 was formed in advance was submerged in the conductive polymer solution A, and then dried at 125° C. for 20 minutes to form a conductive polymer layer. These processes were repeated three times to form a first solid electrolyte layer 9. A commercially-available conductive polymer solution whose D90 is about 30 to 50 nm was used as the conductive polymer solution A. The processes other than these processes for formation of the first solid electrolyte layer 9 were the same as those of Example 1. Further, at this point, the coating rate of the first solid electrolyte layer was 87%.

Comparative Example 1

A first solid electrolyte layer 9 was formed in a similar manner to that of Example 2, and then a second solid electrolyte layer 11 was formed without forming any amine compound layer 10. That is, after a first solid electrolyte layer 9 was formed by using a conductive polymer solution A, it was submerged in a conductive polymer solution B and then dried at 125° C. for 20 minutes to form a first conductive polymer layer of the second solid electrolyte layer 11. A series of the processes from the submergence into the conductive polymer solution B to the drying process was repeated three times to form the second solid electrolyte layer 11. The processes other than the processes for formation of the solid electrolyte layer 4 were the same as those of Example 1.

Comparative Example 2

A solid electrolyte layer 4 was formed only by chemical oxidation polymerization using 3,4-ethylene dioxythiophene. That is, a tantalum sintered body coated with a dielectric layer 2 was submerged in an aqueous solution containing ammonium peroxydisulfate, which is an oxidizing agent, and 1,3,6-naphthalene trisulfonic acid. Next, after dried at a room temperature, it was submerged in 3,4-ethylene dioxythiophene and then kept at a room temperature to polymerize 3,4-ethylene dioxythiophene. A series of these polymerization processes was repeated ten times to form a solid electrolyte layer 4 composed of conductive poly-3,4-ethylene dioxythiophene. The processes other than these processes for formation of the solid electrolyte layer 4 were the same as those of Example 1.

One hundred solid electrolytic capacitors were manufactured in accordance with each of Examples 1 and 2, and Comparative example 1 and 2. Table 1 shows average leakage current failure ratio during the manufacturing process, average initial ESR at 100 kHz, and average ESR after carrying out a heat-resistance test at 125° C. for 1,000 hours.

|  | Leakage current failure ratio (%) | Initial ESR (mΩ) | ESR after 125° C. heat-resistance test of 1,000 hrs. (mΩ) |
| --- | --- | --- | --- |
| Example 1 | 1 | 32.5 | 45.1 |
| Example 2 | 0 | 34.8 | 40.9 |
| Comparative example 1 | 16 | 35.1 | 52.2 |
| Comparative example 2 | 8 | 31.3 | 98.3 |

In Example 1, in which the first solid electrolyte layer was formed by chemical polymerization and the second solid electrolyte layer was formed by applying and drying a conductive polymer solution, an amine compound layer was interposed between them. As a result, it is believed that the formed solid electrolytic capacitors were improved in the adhesive property, were able to withstand the stresses caused by molding and the like, and were improved in terms of the leakage current failure ratio and the ESR degradation.

In Example 2, in which both the first and second solid electrolyte layers were formed by applying and drying a conductive polymer solution, an amine compound layer was interposed between them. Therefore, similarly to Example 1, it is believed that the formed solid electrolytic capacitors were improved in the adhesive property, were able to withstand the stress caused by molding and the like, and were improved in terms of the leakage current failure ratio and the ESR degradation.

Comparative example 1 is different from Example 2 in that the formation of an amine compound layer was omitted in the manufacturing method. Therefore, it is considered that the adhesiveness between the first and second solid electrolyte layers was insufficient and they could not withstand the stresses caused by molding and the like. As a result, the leakage current failure ratio was larger.

In Comparative example 2, the solid electrolyte layer 4 was formed only by chemical polymerization of 3,4-ethylene dioxythiophene. Since the density of a conductive polymer layer that is formed by chemical polymerization is a low, the ESR degradation in the 125° C. heat-resistance test was worse in comparison to the solid electrolytic capacitors manufactured according to Examples of the present invention.

As can be seen from the above results, it has been found out that a highly-reliable solid electrolytic capacitor that is less likely to cause leakage current failures and an increased ESR can be obtained according to Examples of the present invention.

Although exemplary embodiments of the present invention have been explained so far by using Examples, the present invention is not limited to these Examples.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of manufacturing a solid electrolytic capacitor comprising:
   forming a dielectric layer on a surface of an anode conductor comprising a porous valve metal body;
   forming a first solid electrolyte layer on the dielectric layer surface by using at least one of a chemical polymerization method, an electrolytic polymerization method, or a method of applying and drying a conductive polymer solution;
   forming an amine compound layer by applying and drying an amine compound solution or an amine compound dispersion liquid; and
   forming a second solid electrolyte layer by applying and drying a conductive polymer solution.

* * * * *